Oct. 11, 1949.  A. W. BARKER  2,484,670
MACHINE FOR MOLDING PLASTIC MATERIALS,
SUCH AS CONFECTIONERY
Filed Aug. 4, 1947  4 Sheets-Sheet 1

Inventor
Alfred Walter Barker
By Henry Lucke
Attorney

Oct. 11, 1949.

A. W. BARKER 2,484,670

MACHINE FOR MOLDING PLASTIC MATERIALS,
SUCH AS CONFECTIONERY

Filed Aug. 4, 1947

Inventor
Alfred Walter Barker
By Henry J Lucke
Attorney

Oct. 11, 1949.  A. W. BARKER  2,484,670
MACHINE FOR MOLDING PLASTIC MATERIALS,
SUCH AS CONFECTIONERY
Filed Aug. 4, 1947  4 Sheets-Sheet 3

Inventor
Alfred Walter Barker
By Henry J. Lucke
Attorney

Oct. 11, 1949.  A. W. BARKER  2,484,670
MACHINE FOR MOLDING PLASTIC MATERIALS,
SUCH AS CONFECTIONERY
Filed Aug. 4, 1947  4 Sheets-Sheet 4

Inventor
Alfred Walter Barker
By
Henry J. Lucke
Attorney

Patented Oct. 11, 1949

2,484,670

UNITED STATES PATENT OFFICE 2,484,670

MACHINE FOR MOLDING PLASTIC MATERIALS, SUCH AS CONFECTIONERY

Alfred Walter Barker, Tottenham, London, England

Application August 4, 1947, Serial No. 765,866
In Great Britain August 12, 1946

11 Claims. (Cl. 107—8)

This invention concerns a new or improved machine for moulding plastic materials and particularly plastic sugar used in the manufacture of confectionery or sweet-meats (e. g. fruit drops, acid drops and like boiled sweets), the machines being of the kind including a pair of moulding or impression rollers to which the plastic material is fed and between which this material is moulded to the required form, and in which the said rollers are disposed between the two sides of the frame of the machine and have their opposite ends supported in bearings in these sides.

In using machines of the above named kind (which are known, in the confectionery trade, as drop roller machines and are usually operated by female workers) in the manufacture of confectionery, considerable difficulty and loss of time has hitherto arisen due to the plastic sugar adhering to the moulding rollers and so necessitating the complete removal of these rollers from the machines for cleaning or for their replacement by clean rollers.

Similarly when it was desired to change the rollers in order to modify the size or shape of the objects being moulded it was hitherto necessary to remove the moulding rollers completely from the machine.

In drop roller machines of the kind referred to the moulding rollers are arranged vertically one above the other between the two sides of the frame of the machine and to remove these moulding rollers has hitherto been an operation quite outside the experience, skill and strength of the ordinary female worker and one which required the skill and strength of a skilled male engineer since it was necessary to remove bearings and other parts of the machine at both sides of the latter to free the rollers which had then to be lifted, complete with their shafts, vertically from the machine. Thus if the machine were rendered inoperable due to the adherence of the plastic sugar to the rollers or if the surface pattern of the rollers had to be changed, the machine had hitherto to stand idle until an engineer was available to dismantle the necessary section of the machine, lift the moulding rollers from the machine frame and then re-assemble the machine with clean rollers or rollers having a different surface pattern in place of those removed, this operation usually taking upwards of half an hour; meanwhile the machine operator was also idle.

It is an object of the present invention to provide a machine of the kind referred to having improved mountings for the moulding rollers whereby the cleaning of the rollers or the changing of the impressions to be made by the rollers may be more easily effected than has hitherto been possible. A further object of the invention is to provide in such a machine a moulding roller arrangement of such a character that it should be within the ability and strength of any normally intelligent and skillful operator (whether male or female) of normal physical fitness to effect the said cleaning or changing operation without the assistance of a skilled male engineer.

According to the invention there is provided a machine of the kind referred to for moulding plastic materials, especially plastic sugar in the manufacture of confectionery, wherein the moulding rollers are each furnished with an axially withdrawable impression cylinder and wherein the frame of the machine may be opened at least at one side to permit of the endwise withdrawal of the said impression cylinders from their rollers and through the side of the frame without removing the rollers themselves from the machine.

According to a further aspect of the invention there is provided a machine of the kind referred to for moulding plastic materials, especially plastic sugar in the manufacture of confectionery, wherein the moulding rollers are each furnished with an interchangeable impression cylinder removable axially from an end of the roller, and wherein the frame of the machine, at least at one side, is provided with a section or sections positioning moulding roller bearings in this side of the machine but capable of being moved with respect to the said frame side to enable the said bearings to be removed axially from the corresponding roller trunnions or roller-shaft ends and to open the frame side in order to expose the adjacent ends of the rollers for the endwise removal of the said impression cylinders from their rollers through the opened side of the machine—for cleaning, replacement or other purposes—without removing the rollers themselves from the machine.

By this invention the necessity for the complete removal of the rollers from the machine for cleaning or replacement is avoided, it merely being necessary to expose the ends of the two rollers at one side of the machine and then to remove the impression cylinders encasing the rollers endwise from the latter. The work involved is thus not such heavy or skilled work as was hitherto entailed by the complete removal of the rollers from the machine, and can be accomplished in a few minutes.

According to a further feature of the invention a section of the said openable frame-side is completely removable on each side of the bearings for the said moulding rollers, and, when removed, these sections leave a gap in the side frame large enough to expose the ends of the said rollers and to permit of the endwise removal through this gap of the impression cylinders of these rollers.

The said removable sections may be formed separately of one another and be arranged, when fitted into their side of the machine frame, to retain the roller bearings that are between them against axial movement along the roller trunnions or shaft-ends whilst leaving a slot along which these bearings are capable of relative adjustment.

The said impression cylinders are preferably withdrawable from one end only of their rollers and are retained upon the latter by end or retaining plates having quick-release fastenings with the rollers.

Where a water circulating sytem is provided to cool (or heat) the rollers internally, this system may be associated with the rollers at the end opposite to that at which the impression cylinders are to be withdrawn so that the said system need not, in a machine constructed according to this invention, be disturbed when changing the impression cylinders in contradistinction to the hitherto known machines of the kind referred to where the whole circulating system had to be disconnected from the rollers to enable the latter to be removed from the machine.

Preferably mechanical adjustment means are provided for adjusting the bearings of one of the moulding rollers in the sides of the frame of the machine, and means are preferably provided for fixing the bearings of the other moulding roller in such frame so that the adjustment of the first mentioned roller varies the distance between the rollers as well as serving to permit separation of the two rollers when the impression sleeves of one or both of the rollers is or are to be removed. The said adjustment device preferably includes a "fine" adjustment and a "coarse" adjustment, the latter serving to enable the adjustable roller to be moved quickly to or from the other roller when desired.

Further features of the invention will become apparent from the appended description and claims.

In order that the nature of the invention and the manner of carrying same into practice may be more thoroughly understood an embodiment of the same in a drop roller machine for use in the manufacture of boiled sweets, such as, for example, fruit drops, from plastic sugar will now be described by way of example with reference to the accompanying drawings in which—

Figure 6 is a part sectional plan view showing a detail of the water circulating system of the moulding rollers of the machine.

Figure 1:
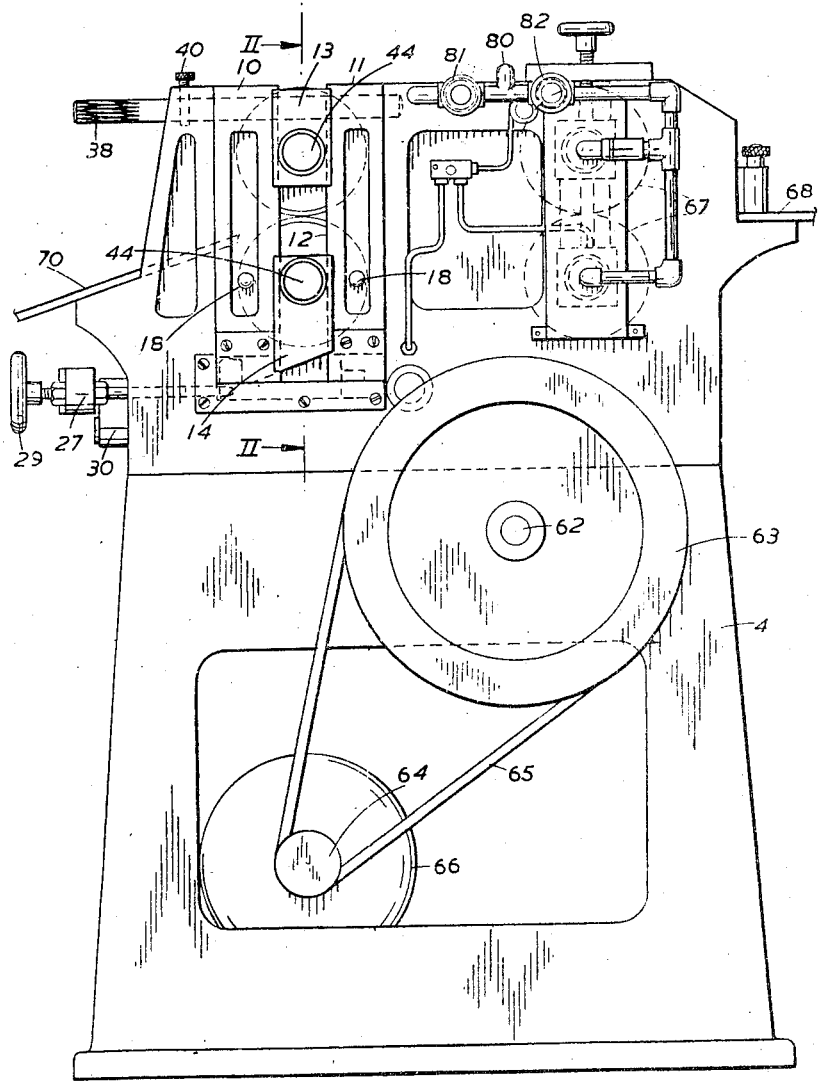
Figure 1 is a side elevation of the said drop roller machine.
Figure 2:
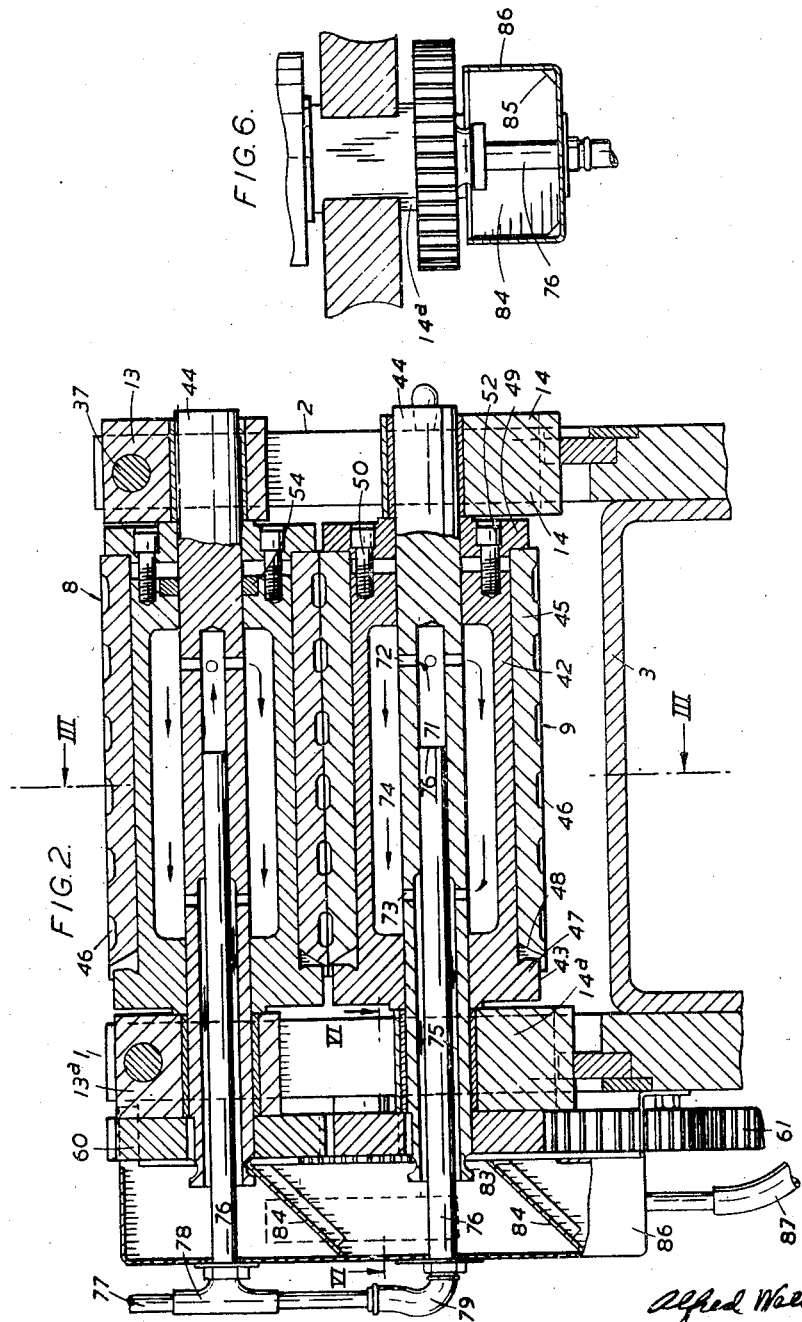
Figure 2 is a section on line II—II Figure 1, on a larger scale.

The machine illustrated in the drawings comprises a frame including two parallel upright sides 1 and 2 spaced apart by an inverted U-shaped rigid spacing element 3 extending between the lower ends of said sides and rigidly fixed thereto.

The said frame is mounted upon a base 4 which may be formed as a hollow metal casting. The sides 1 and 2 are likewise conveniently formed as metal castings and the side 2 is furnished, near the discharge end 26 of the machine, with a vertical gap or slot 5 of rectangular form and open at the upper edge of the side 2. The vertical sides 6 and 7 of the said gap are parallel and extend from the upper edge of the side 2 downwardly towards, but not quite to, the lower edge of such side as is clearly seen from the drawings.

The horizontal width of the gap 5 is somewhat greater than the external diameters of the moulding rollers 8 and 9 of the machine, which will hereinafter be described, and a pair of removable metal sections 10 and 11 are provided for insertion in the gap 5, one adjacent and in contact with each vertical side 6 and 7 of the gap.

The insert sections 10 and 11 are of rectangular cross-sectional shape and of long oblong form, the sections being adapted, when introduced into the gap 5 as shown in Figure 1, partially to fill the gap 5 but to leave centrally of the latter a vertical space or slot 12 in which are located, one above the other, a pair of bearing blocks 13 and 14, these bearing blocks respectively having at their inner and outer longitudinal sides flanges 15, 15 and 16, 16, respectively adapted to embrace between them the inner vertical edges of the removable insert sections 10 and 11 which accurately position these bearing blocks in the sides 2 of the machine frame. The bearing blocks 13 and 14 are to carry the shaft ends of the rollers 8 and 9 as hereinafter described and completely encircle these shaft ends instead of being half bearings as hitherto.

The side 1 of the frame is provided with a vertical slot 17 having a parallel rectilinear side and which is arranged centrally opposite the gap 5 in the side 2 of the machine frame; in this slot are mounted a pair of bearing blocks 13a and 14a corresponding in all respects with the bearing blocks 13 and 14 above referred to.

The slot 12 in the side 2 of the machine frame corresponds in form to the slot 17 in the side 1 of the frame, but the vertical sides of the slot 12 are defined by the inner vertical edges of the removable insert sections 10 and 11 instead of by the side 2, the said sections being complementary to the latter side but being removable therefrom by sliding them upwardly between the flanges 15, 15 and 16, 16 of the upper and lower bearing blocks 13 and 14. Outwardly projecting handles 18 are provided on the sections 10 and 11 to facilitate the removal of these sections from the side 2 of the machine frame or their replacement in the latter.

The lower ends of the removable sections 10 and 11 each have a recess 19 bounded on the outer side by a plate 20 and the recesses 19 in the two inserts serve to house the upper portion of an adjusting cam 21 of wedge form slidably mounted in a horizontal groove 22 in the side member 2 of the machine frame at the bottom of the gap 5, this groove 22 constraining the cam 21 to slide in a plane parallel to the outside longitudinal surface of the side 2 of the machine frame and so at right angles to the axes of the rollers 8 and 9 of the machine. The upper oblique edge 23 of the cam 21 is adapted to engage and co-operate with the correspondingly inclined lower end 24 of the lower bearing block 14. A similar cam 21 is provided in the other side member 1 of the machine frame and similarly co-operates with the inclined underside of the bearing block 14a at that side of the machine.

The said two cams 21 are respectively fixed to the inner ends of a pair of parallel horizontal cam actuating rods 25 each slidably mounted in the corresponding side member of the machine frame and projecting beyond the discharge end 26 of the latter. The slidable actuating rods 25 are adjustably fixed one in each end of a rigid horizontal adjusting screw 28 furnished with a handle or wheel 29 at its outer end and adapted to bear at its inner end upon the outer surface of a circular quick-release block 30. This block is eccentrically pivoted at 31 to the discharge end of the machine base 4 so that it can be swung upwardly into position between the inner end of the screw 28 and the discharge end of the machine frame as shown in full lines in Figure 3 for example, or dropped into the position indicated by dot-and-dash lines in the same figure.

Figure 3:
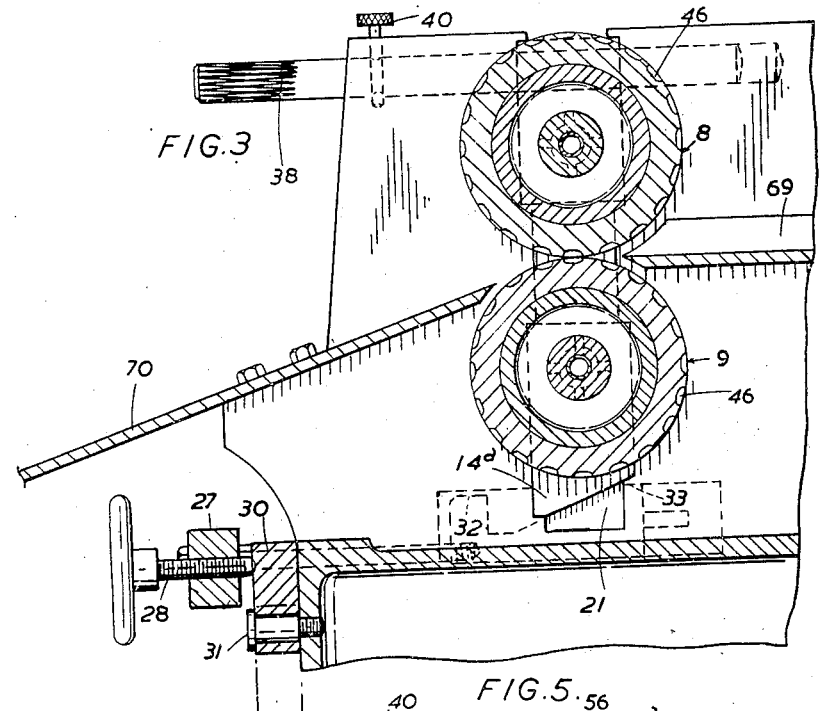
Figure 3 is a section on line III—III Figure 2.

The cams 21 are provided for raising and lowering the lower bearing blocks 14 and 14a of the lower moulding roller 9 of the machine, and to raise these bearing blocks the quick-release block is swung into the full line position shown in Figure 3 and the screw 28 is tightened up so as to force the cross bar 27 outwardly away from the quick-release block 30. To lower the bearing blocks 14 and 14a the screw 28 is released and the quick-release block 30 thrown to one side so that the latter part of the inward movement of the cams 21 may be hastened by pushing the cross bar 27 inwards towards the machine base 4. The screw 28 provides a "fine" adjustment for the cams and the block 30 provides a "coarse" adjustment therefor.

The end portions 32 and 33 of the cams 21 are located in the recesses 19 in the lower ends of the removable insert sections 10 and 11 and so locate the latter in register with the portions of the side 2 of the machine frame adjacent the gap 5 in such side.

Each of the sides 1 and 2 of the machine frame is provided, adjacent its upper edge, with a longitudinal horizontal bore 34, this bore extending, in the case of the side 1 on both sides of the vertical slot 17, and in the case of the side 2, beyond both vertical edges of the gap 5, and each of the upper bearing blocks 13a and 13 is provided with a similar horizontal bore 35 adapted for registration with corresponding bore 34; the inserts 10 and 11 are similarly provided with horizontal bores 36 for registration with the bores 34 and 35 in the adjacent bearing blocks 13 and side 2 of the machine frame.

A securing pin 37 of substantial dimensions is provided for each of the sides 1 and 2 of the machine frame and is, in the case of the side 1 adapted to be inserted into the bore 34 in such side and to be passed through the bore 35 in the bearing block 13a to secure the latter against movement in the slot 17 of the side 1 of the machine frame whilst, in the case of the side 2, the securing pin 37 is adapted to pass through the bore 34 in this side and also through the bores 36 in the sections 10 and 11 and bore 35 in the upper bearing block 13 so as to secure all these parts against relative movement.

The pins 37 are provided with a grip 38 at their outer ends and are also each provided with an annular groove 39 adapted to co-operate with a removable locking pin 40 inserted into a vertical hole 41 in the corresponding side of the machine frame to lock the pin 37 against axial movement in the latter.

The rollers 8 and 9 are both of similar constructions and are disposed one directly over the other their axes parallel to one another. Each roller comprises a hollow cylindrical core 42 and cylindrical impression cylinder 45, the said core having a peripheral flange 43 at the end thereof adjacent the side 1 of the machine frame and being mounted and fixed upon an axial shaft 44 which projects beyond both ends of the core 42, the projecting ends of the upper roller shaft forming trunnions which are supported in the upper bearing blocks 13 and 13a whilst the projecting ends of the shaft of the lower roller form trunnions which are journalled in the bearing blocks 14 and 14a.

An impression cylinder 45 is concentrically mounted on each of the roller cores 42, such cylinders being formed of bronze or other suitable metal and each having in its outer surface depressions 46 of any suitable form depending upon the shape of the sweets to be moulded by these impression cylinders. The impression cylinders 45 are identical in form and are prevented from rotation with respect to their roller cores 42 by the engagement of radial inwardly directed keys or teeth 47 on the end flanges 43 of the roller cores and which keys or teeth 47 engage in correspondingly positioned keyways or notches 48 in the adjacent ends of the impression cylinders.

The impression cylinders are each detachably retained on their roller cores 42 by a retaining plate or disc 49 engaging the adjacent end of the impression cylinder 45 and secured to the corresponding end of the roller core 42 by a quick release fastening comprising socket headed screws 50 passing through arcuate slots 51 in the retaining plate and having their heads 52 adapted to engage against inwardly directed keyhole-shaped flanges 53 of the slots 51. Thus the impression cylinders may be released from their rollers by slacking off the screws 50 and then giving the retaining plates a slight turn about the roller shafts in order to bring the heads 52 of these screws into alignment with the enlarged portions of the keyhole-shaped slots in the retaining plates to enable the latter to be drawn axially from their roller shafts 44 and so to release the impression cylinders for endwise withdrawal from the roller cores 42 away from the flanged ends of the latter.

Figure 5:
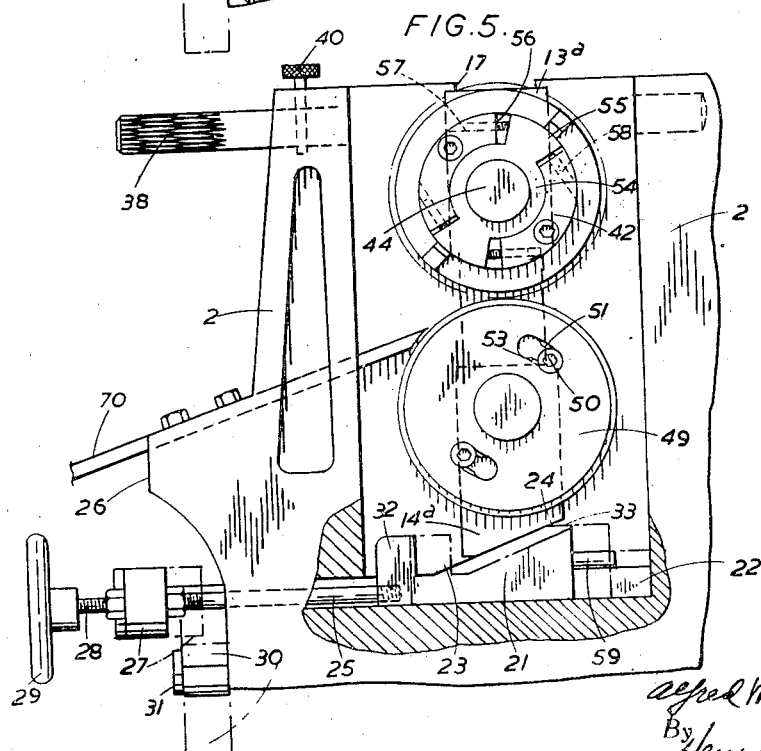
Figure 5 is a part sectional side elevation of the same machine and showing the same side of the machine as Figure 1 but with the removable sections of a side of the frame of the machine and the corresponding bearings for the rollers removed.
Figure 4:
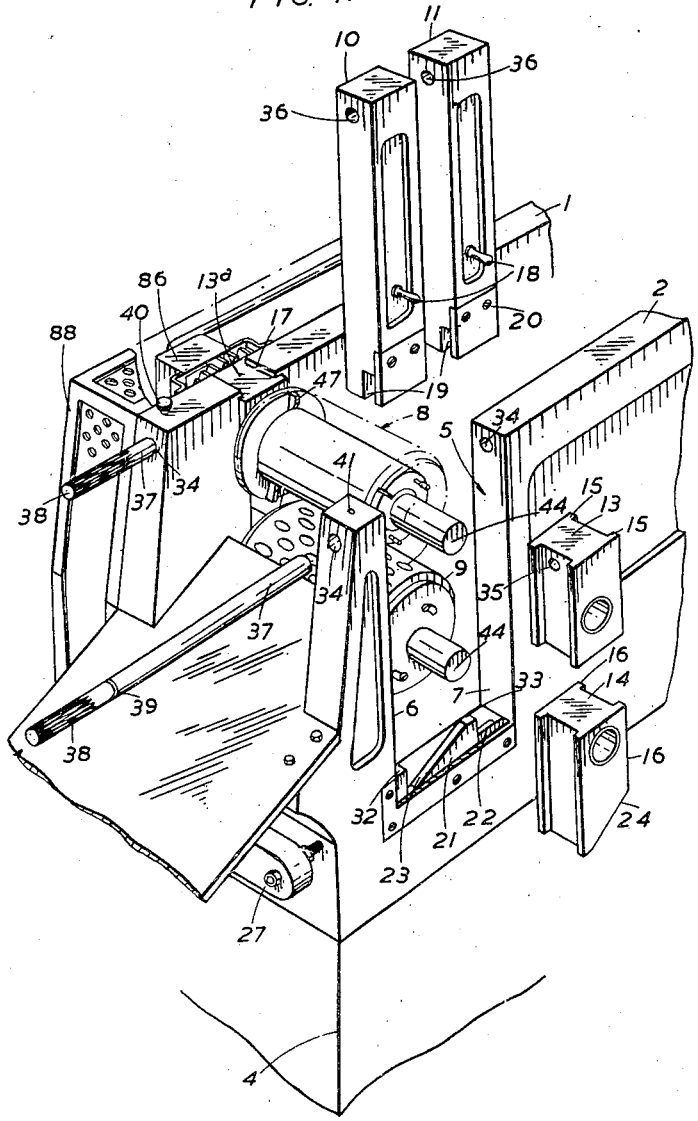
Figure 4 is a perspective view showing the discharge end of the machine illustrated in Figures 1 to 3 with some of the parts of the machine removed to illustrate the method of changing the impression cylinders of the machine constructed in accordance with this invention.

To permit of rotational adjustment of at least one of the rollers about the shaft 44 in order to bring the depressions 46 in the two impression cylinders of the two rollers into strict register with one another, one of the rollers is provided with adjusting means, such means being shown in the drawing as applied to the top roller and comprising a collar 54 which is keyed or otherwise fixed upon the shaft 44 and furnished with a pair of diametrically opposite sector-shaped wings 55 each seated in a correspondingly shaped but larger recess 56 in the adjacent end of the roller core 42, substantially tangential adjusting grub screws 57 and 58 being provided in the end of the said roller core to enable the angular position of the core about the axis of the shaft 44 to be adjusted to a small extent. This arrangement is clearly shown in Figure 5.

It will be understood that when the machine is in normal operation the bearing blocks 13 and 13a of the upper roller are fixed whilst the lower bearing blocks 14 and 14a for the lower roller are vertically adjustable by appropriate manipulation of the cams 21, the upward and downward adjustment of the lower blocks 14 and 14a being limited by the horizontal movement permissible to the cams 21. The inward movement of the cams 21 is limited by stop pins 59 fixed to their inner ends and the outward movement of the cams is limited by their end portions 32 abutting stop surfaces on the machine frame.

The shafts of the upper and lower rollers are geared together by spur gears 60 fixed on the ends of the shafts outside the side 1 of the machine frame and the necessary drive is imparted to this gearing by further gearing 61 which may be driven through a shaft 62, pulleys 63 and 64 and a belt 65 from an electric motor 66 carried by the base 4 of the machine, or by any other suitable driving means.

The machine is furnished, as is usual with drop roller machines for the manufacture of sweets, with a pair of superposed presizing rollers 67 arranged one above the other in front of the moulding rollers 8 and 9. These rollers do not normally have to be removed from the machine and therefore may be mounted in the sides 1 and 2 of the machine in the usual manner. A feed tray 68 is provided to lead the plastic sugar to the pre-sizing rollers and a platform or tray 69 serves to lead the presized or pre-rolled plastic sugar to the moulding rollers 8 and 9, whilst an inclined discharge chute 70 serves to lead the moulded sweets from the moulding rollers to an endless conveyor or any other suitable discharge apparatus.

The temperature of the moulding rollers is preferably controlled by circulation of water through the rollers and this may be either cold water or hot water according to whether it is desired to cool the rollers or to heat them.

For the purpose of water circulation through the rollers each of the shafts 44 is provided with an axial bore 71 closed at its inner end and open at its outer end, such bore communicating, by two axially spaced series of radial bores 72 and 73, with the opposite ends of an internal annular chamber 74 formed between the hollow core 42 and the shaft 44.

The axial bore 71 of each shaft 44 is formed in two diameters, the outer portion 75 of the bore being of larger diameter than the inner portion of the bore into which fits tightly the inner end of a rigid tube 76 arranged coaxially in the bore 71 and projecting through and outwardly beyond the open end of the shaft.

Water is supplied to the outer ends of the upper and lower tubes 76 by means of a supply pipe 77 communicating with the upper tube 76 by a rigid T-element 78 and with the lower tube 76 by a flexible hose 79 which does not interfere with the free upward and downward adjustment of the bottom moulding roller 9. The water is supplied to the pipe 77 from a suitable supply pipe 80 which also supplies water to the pre-sizing rollers 67, the flow of water being controlled by appropriate valves such as the valves 81 and 82.

The open ends of the bores 71 and shafts 44 and the pipe 77 and parts associated therewith are arranged at the gear-provided ends of the shafts 44, i. e. at the side of the machine opposite to that at which the removable insert sections 10 and 11 are provided, and adjacent the said openings the shafts 44 are provided with annual grooves 83 which will impede the flow of water axially along the outsides of the shafts when water is discharged from the enlarged portion of the bore 75, the water that is supplied through the tubes 76 passing along the shafts 44 through the radial bores 72 into the annular chambers 74 and then out of the latter through the radial bores 73 into the enlarged portions 75 of the axial bores of the shafts and then being discharged from the open ends of the shafts on to inclined deflector plates 84 having cut-away corners 85, see Figure 6, carried in a rectangular housing 86 detachably fixed to the side 1 of the machine and having an outlet pipe 87 at the bottom thereof.

The gearing 60, 61, etc. and the housing 86 of the water circulating system may all be enclosed by a protective guard 88.

The operation of the machine above described in so far as this invention is concerned is as follows:

Assuming that the machine has been in operation and that it is desirable to change the impression cylinders 45 because either these cylinders have become clogged with the plastic sugar or it is desired to use alternatively patterned impression cylinders, then in order to effect this change the machine is stopped and the bottom roller is lowered by first loosening the adjusting screw 28 so as to free the quick-release block 30, which is swung aside, and then pushing the cross bar 27 inwardly. Next, the pin 37 in the side 2 of the machine frame is withdrawn so as to free the removable insert sections 10 and 11 in order that they may be slidden upwardly out of the gap 5 in the said frame side 2.

After the sections 10 and 11 have been lifted from the gap 5 and laid aside, the bearings 13 and 14 are drawn from the ends of the roller shafts 44 which they have been supporting so that the ends of the rollers 8 and 9 at the side 2 of the machine are wholly exposed. The socket headed screws 50 securing the retaining plates 49 are now released and these retaining plates are given a slight angular rotation about the shafts 44 of the rollers so as to bring the heads of the screws 50 into the enlarged portions of the keyhole slots 51 after which the retaining plates may be withdrawn endwise from the roller shafts 44. The impression cylinders are now free for endwise withdrawal from their roller cores.

When the impression cylinders have been cleaned and are ready for remounting upon the roller cores, or alternative impression cylinders are ready for mounting on these cores, these impression cylinders are mounted and the various parts of the machine re-assembled in a manner the reverse of that above described for the removal of the impression cylinders from the roller cores.

The operation above described takes only a matter of a few minutes and is easily accomplished without the exertion of any considerable mechanical skill or exceptional physical force being necessary. It will also be seen that the impression cylinders can be changed without in any way interfering with the water circulating system or other operative parts of the machine. In addition the speeding up of the operation of changing the impression cylinders achieved by this invention avoids the hardening of the plastic sugar batch in the machine which has hitherto been a further disadvantage of the known machines of the type referred to.

I claim:

1. A machine for moulding plastic material, particularly plastic sugar from which confectionery is made, comprising a frame having a pair of spaced upstanding side members, a pair of co-operating moulding rollers mounted between said side frame members, bearings for the trunnions of said moulding rollers mounted in slots in said frame side members, one at least of said frame side members having a gap wider than the external diameter of each of said rollers and opposite the adjacent ends of the latter, and positioning means in said gap for operatively locating in the gap-provided side member of said frame the bearings for the said trunnions of said rollers at the end adjacent this frame side member, such positioning means defining the said slot for the said bearings and being movable transversely of the axes of the said rollers for releasing the said bearings normally positioned thereby and opening the said gap to enable the said rollers to be withdrawn endwise through the said gap.

2. A machine as claimed in claim 1, wherein said bearings comprise a pair of bearing blocks mounted one above the other in each of the slots of said frame side members for receiving the trunnions of the respective adjacent end of a moulding roller, and the positioning means comprise locating sections positioned in the gap of the gapped frame side member in interengagement with, and one on either side of the bearing blocks in this gap, said machine further including means for securing the said insert sections removably in the gapped frame side member.

3. A machine for moulding plastic materials, particularly plastic sugar in the manufacture of confectionery, comprising a frame having a pair of spaced upstanding side members, a pair of co-operating moulding rollers mounted one above the other between said frame side members, bearing means for the trunnions of said rollers mounted in said frame side members, driving means for said moulding rollers, and positioning means mounted in one frame side member at least of the machine for locating said bearing means in position in this side member, said positioning means being movable relatively to the remainder of its frame side member in a direction transverse to the axis of rotation of the rollers to release the bearing means located thereby and to leave a gap in the frame side member large enough to permit the endwise passage of a moulding roller.

4. A machine for moulding plastic material, particularly plastic sugar from which confectionery is made, comprising a frame having a pair of spaced upstanding side members, a pair of co-operating moulding rollers mounted between said side members, an outer coaxial impression cylinder mounted on each of said rollers and rotatable therewith but withdrawable axially therefrom, bearings for the trunnions of said moulding rollers mounted in slots in said side members, one at least of said side members having a gap which is wider than the external diameter of each of said impression cylinders and is located opposite the adjacent ends of the latter, and positioning means for operatively locating in the gap in their frame side member the bearings for said trunnions of said rollers at the end adjacent the gapped side member, said positioning means defining the said slot for the said bearings and being movable transversely of the axes of said rollers for releasing the bearings normally positioned thereby and for opening said gap to enable one at least of the impression cylinders to be withdrawn endwise from its roller and through said gap.

5. A machine for moulding plastic material, particularly plastic sugar from which confectionery is made, comprising a frame having a pair of spaced upstanding side members, a pair of co-operating moulding rollers mounted between said side members, an outer coaxial impression cylinder mounted on each of said rollers and rotatable therewith but withdrawable axially therefrom, a pair of superposed bearing blocks, each for supporting the end trunnion of a moulding roller, mounted in a slot in each frame side member, one at least of said side members having a gap which is wider than the external diameter of each of said impression cylinders and is located opposite the adjacent ends of the latter, and positioning means for operatively locating in the gap in their frame side member the bearing blocks for said trunnions of said rollers at the end adjacent the gapped side member, said positioning means defining the said slot for the said bearing blocks and being movable transversely of the axes of said rollers for releasing the bearing blocks normally positioned thereby and for opening said gap to enable one at least of impression cylinders to be withdrawn endwise from its roller and through said gap, and cam means operable from the exterior of the machine for adjusting the lower bearing blocks relatively to its frame side member to vary the position of the lower roller with respect to the upper roller.

6. A machine according to claim 5, including an adjusting screw co-operating with said cam means and a spacing block which is pivotally mounted on the machine frame and on which said adjusting screw is adapted to bear, said pivoted block being movable out of alignment with said adjusting screw to provide for more rapid adjustment of the cam means.

7. A machine according to claim 4, wherein said rollers are provided with detachable retaining plates at one end thereof to secure the said impression cylinders upon the rollers, and the latter are provided with screws co-operating with keyhole slots in the said retaining plates to serve as quick release fastening means for said retaining plates.

8. A machine according to claim 4, wherein the two moulding rollers are geared together and at least one of them has means for rotationally adjusting its impression cylinder about the axis of the roller.

9. A machine according to claim 4, wherein the said moulding rollers are hollow and means are provided for circulating roller temperature regulating liquid through said rollers, such circulating means being connected to the ends of the roller trunnions remote from the gapped member of the machine frame so as to be undisturbed by the removal of the said positioning means and bearings of this side member.

10. A machine for moulding plastic materials, particularly plastic sugar in the manufacture of confectionery, comprising a frame having a pair of spaced upstanding side members, a pair of co-operating moulding rollers having trunnions and mounted one above the other between said side members, an impression cylinder forming the periphery of each said moulding roller and rotatable with, but axially withdrawable from, this roller, one at least of said side members being formed with a gap of a width sufficient to permit the passage therethrough of an impression cylinder on withdrawal of the latter axially from its roller, bearing means for the trunnions of said rollers mounted in said gap in the one side member and in a vertical slot in the other side member, the bearing means for reception in the gapped side member being less in width than this gap, and at least one insert section mounted in said gap for guided movement transversely to the axes of rotation of the moulding rollers, said insert section being adapted to position such bearing means in position in said gap but, on removal from the gap, to release said bearing means for removal and open the gap to permit the passage of an impression cylinder.

11. A machine for moulding plastic materials, particularly plastic sugar in the manufacture of confectionery, comprising a frame having a pair of spaced upstanding side members, a pair of cooperating moulding rollers having trunnions and mounted one above the other between said side members, an impression cylinder forming the periphery of each said moulding roller and rotatable with, but axially withdrawable from, this roller, one at least of said side members being formed with a gap of a width sufficient to permit the passage therethrough of an impression cylinder on withdrawal of the latter axially from its roller, a bearing block for each roller trunnion, a pair of such blocks being arranged in said gap and the other pair in a vertical slot in the other side member, the bearing blocks for reception in said gap being less in width than the latter, positioning means mounted in said gap and flanking the bearing blocks therein to close the width of said gap, said positioning means being adapted to slide upwards in guided fashion on said bearing blocks to release the latter and open the gap for withdrawal of an impression cylinder without otherwise disturbing the machine assembly, and removable means for securing said positioning means and bearing blocks in assembled condition in the respective frame side member.

ALFRED WALTER BARKER.

REFERENCES CITED

The following references are of record in the file of this patent:

UNITED STATES PATENTS

| Number | Name | Date |
|--------|------|------|
| 361,822 | Hohre et al. | Apr. 26, 1887 |
| 1,797,568 | Dean | Mar. 24, 1931 |
| 2,308,040 | Anderson | Jan. 12, 1943 |